(12) United States Patent
Borne

(10) Patent No.: US 11,330,385 B2
(45) Date of Patent: *May 10, 2022

(54) AUDIO DEVICE

(71) Applicant: Steven Jay Borne, New York, NY (US)

(72) Inventor: Steven Jay Borne, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,344

(22) Filed: Jun. 26, 2019

(65) Prior Publication Data

US 2019/0320279 A1    Oct. 17, 2019

Related U.S. Application Data

(63) Continuation of application No. 14/813,640, filed on Jul. 30, 2015, now Pat. No. 10,362,422.

(Continued)

(51) Int. Cl.
*H04S 3/00* (2006.01)
*G06F 3/16* (2006.01)
(Continued)

(52) U.S. Cl.
CPC ............. *H04S 3/006* (2013.01); *G06F 3/165* (2013.01); *G10L 21/0356* (2013.01); *H04N 5/04* (2013.01); *H04R 3/04* (2013.01); *H04R 3/12* (2013.01); *H04S 1/002* (2013.01); *H04S 3/002* (2013.01); *H04S 3/008* (2013.01); *H04S 7/301* (2013.01);
(Continued)

(58) Field of Classification Search
CPC .......... H04S 3/006; H04S 1/002; H04S 3/008; H04S 7/301; H04S 2400/01; H04S 2400/03; H04S 2400/05; H04S 2400/07; H04S 2400/09; G06F 3/165; G10L 21/0356; H04N 5/04; H04R 3/04; H04R 3/12

See application file for complete search history.

(56) References Cited

U.S. PATENT DOCUMENTS 4,024,344 A * 5/1977 Dolby ....................... H04S 5/00
                                                    381/27
4,490,691 A * 12/1984 Dolby ...................... H03G 9/18
                                                    333/14

(Continued)

FOREIGN PATENT DOCUMENTS

| CN | 1369189 A | 9/2002 |
| CN | 1624759 A | 6/2005 |

(Continued)

OTHER PUBLICATIONS

Notification Concerning Transmittal of International Preliminary Report on Patentability for WO2016/019130, "Audio Device", dated Feb. 16, 2017.

(Continued)

*Primary Examiner* — Matthew A Eason
*Assistant Examiner* — Kuassi A Ganmavo
(74) *Attorney, Agent, or Firm* — Hamilton, Brook, Smith & Reynolds, P.C.

(57) ABSTRACT

A method and system dynamically adjusts the audio of an audio and video signal to improve its overall sound quality and dialog intelligibility. Some embodiments use gain, equalization, audio signal compression and spatial enhancement (reverb) on individual channels of a multichannel audio signal.

17 Claims, 6 Drawing Sheets

Related U.S. Application Data

(60) Provisional application No. 62/032,205, filed on Aug. 1, 2014.

(51) Int. Cl.
*H04S 7/00* (2006.01)
*H04R 3/12* (2006.01)
*H04R 3/04* (2006.01)
*G10L 21/0356* (2013.01)
*H04N 5/04* (2006.01)
*H04S 1/00* (2006.01)

(52) U.S. Cl.
CPC ....... *H04S 2400/01* (2013.01); *H04S 2400/03* (2013.01); *H04S 2400/05* (2013.01); *H04S 2400/07* (2013.01); *H04S 2400/09* (2013.01)

(56) References Cited

U.S. PATENT DOCUMENTS

| | | | |
|---|---|---|---|
| 5,892,834 A | 4/1999 | Smart | |
| 6,088,461 A * | 7/2000 | Lin | H03G 3/002 |
| | | | 381/104 |
| 6,442,278 B1 | 8/2002 | Vaudrey | |
| 6,704,421 B1 * | 3/2004 | Kitamura | H03G 5/005 |
| | | | 381/103 |
| 7,251,337 B2 * | 7/2007 | Jacobs | H04S 7/00 |
| | | | 381/104 |
| 7,551,745 B2 | 6/2009 | Gundry | |
| 7,692,724 B2 | 4/2010 | Arora | |
| 7,787,632 B2 | 8/2010 | Ojanpera | |
| 8,509,464 B1 | 8/2013 | Kato et al. | |
| 8,620,006 B2 | 12/2013 | Berardi | |
| 8,705,748 B2 | 4/2014 | Walsh | |
| 10,362,422 B2 | 7/2019 | Borne | |
| 2001/0022841 A1 * | 9/2001 | Motojima | H04S 3/00 |
| | | | 381/27 |
| 2003/0125933 A1 | 7/2003 | Saunders | |
| 2004/0105559 A1 | 6/2004 | Aylward et al. | |
| 2004/0213420 A1 * | 10/2004 | Gundry | H03G 9/10 |
| | | | 381/104 |
| 2007/0230725 A1 | 10/2007 | Wang | |
| 2008/0165989 A1 * | 7/2008 | Seil | H04H 60/04 |
| | | | 381/119 |
| 2009/0016547 A1 * | 1/2009 | Aoki | H03G 3/02 |
| | | | 381/107 |
| 2009/0245539 A1 * | 10/2009 | Vaudrey | H03G 7/002 |
| | | | 381/109 |
| 2009/0290725 A1 | 11/2009 | Huang | |
| 2010/0232619 A1 | 9/2010 | Uhle | |
| 2011/0054887 A1 | 3/2011 | Muesch | |
| 2011/0112664 A1 | 5/2011 | Ong | |
| 2011/0119061 A1 | 5/2011 | Brown | |
| 2011/0251704 A1 | 10/2011 | Walsh | |
| 2013/0024190 A1 | 1/2013 | Fairey | |
| 2013/0089208 A1 | 4/2013 | Fairey | |
| 2013/0156225 A1 * | 6/2013 | Griffiths | H03G 3/00 |
| | | | 381/98 |
| 2014/0294200 A1 * | 10/2014 | Baumgarte | G10L 21/0316 |
| | | | 381/107 |
| 2014/0334642 A1 * | 11/2014 | Kwak | H03G 9/025 |
| | | | 381/102 |
| 2015/0036867 A1 * | 2/2015 | Unruh | H04R 9/063 |
| | | | 381/398 |

FOREIGN PATENT DOCUMENTS

| | | | |
|---|---|---|---|
| CN | 1748443 A | | 3/2006 |
| CN | 1774861 A | | 5/2006 |
| CN | 101842834 A | | 9/2010 |
| CN | 103039023 A | | 4/2013 |
| JP | 2005229544 A | * | 8/2005 |
| JP | 2010136236 A | * | 6/2010 |

OTHER PUBLICATIONS

Hoeg, et al., "Dynamic Rang Control DRC and Music Speech Control MSC," DAB, 1994.

* cited by examiner

AUDIO DEVICE

RELATED APPLICATIONS

This application is a continuation of U.S. application Ser. No. 14/813,640, filed on Jul. 30, 2015, which claims the benefit of U.S. Provisional Application No. 62/032,205, filed on Aug. 1, 2014. The entire teachings of the above applications are incorporated herein by reference.

BACKGROUND

Currently the standard connection cable for consumer televisions is a High Definition Multimedia Interface (HDMI) cable. Typically, the HDMI cable carries a video signal and both a stereo and 5.1 channel audio signal from a media source to the playback device. If the playback device is a television with only two speakers, the television will utilize the stereo audio signal. Similarly if the playback device is a 5.1 channel surround sound system; it will utilize 5.1 channel audio signal.

SUMMARY

One common problem is that the dialog portion of the audio signal is often to low which makes it difficult to hear clearly. Current home audio systems and playback devices are unable to efficiently enhance the dialog on selected channels. Another issue is that the stereo signal from the source is of poor quality compared to the 5.1 channel audio signal.

The present approach relates to a method and system that dynamically adjusts an audio signal to improve its overall sound quality and dialog intelligibility. Some embodiments use gain, equalization, audio signal compression and spatial enhancement (reverb) on individual channels of a multichannel audio signal.

One non-limiting embodiment is a method comprising receiving a multichannel audio signal, processing each channel of the multichannel audio signal separately, including processing at least one channel of the multichannel audio signal by adjusting at least one of the following, a gain, an equalization, and a dynamic range, to adjust dialog information in the at least one channel, and passing the processed audio channels to a device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
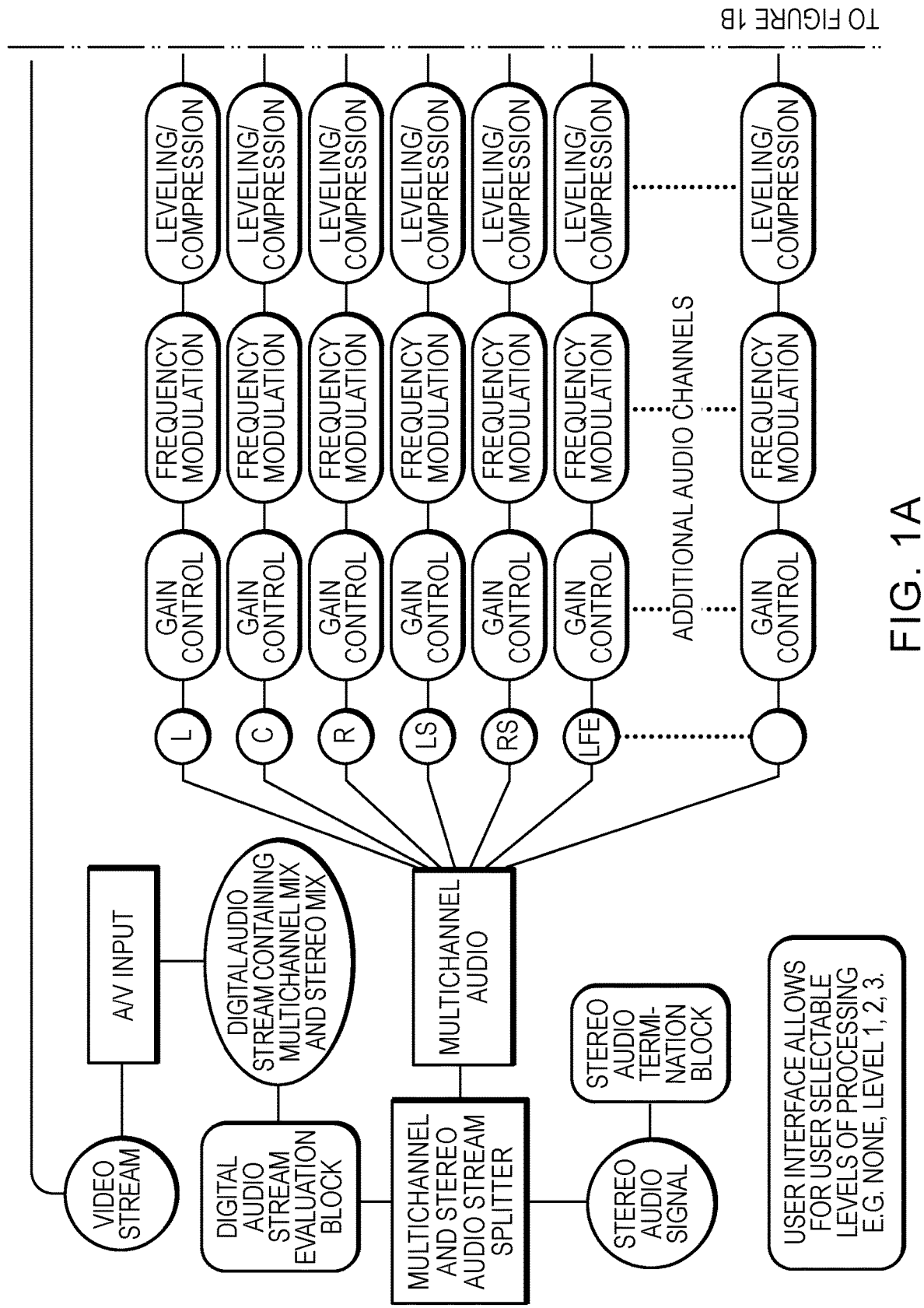
FIG. 1A-FIG. 1B illustrates a block diagram of one example embodiment of the invention.
Figure 1B:
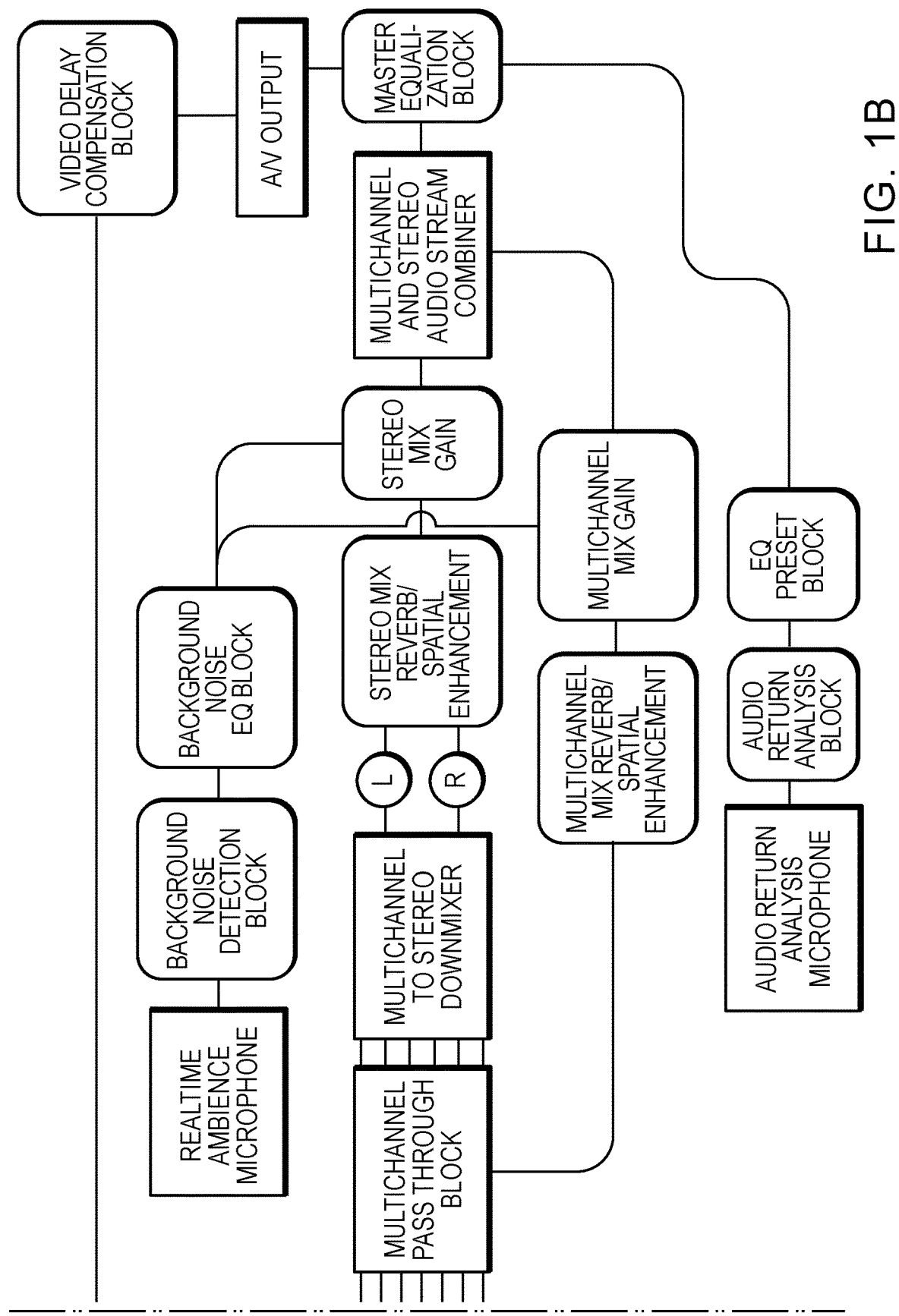

In one embodiment of the invention, shown in FIGS. 1A and 1B, audio signals are received at the A/V Input 102 in the form of a multichannel (5.1, 7.1, etc . . . ) and a stereo audio signal 104. The Digital Audio Stream Evaluation Block 106 analyzes the multichannel audio and stores values for overall level, dynamic range, and signal placement, which is usually referred to as panning. The Digital Audio Stream Evaluation Block operates in real time and is configured to continuously update the values. The overall gain level and dynamic range values are calculated based on a 3-5 second average, and panning and placement values are updated instantaneously. The overall gain level value is passed on to the Multichannel Audio Mix Gain block 146, shown in FIG. 1B, to ensure that the overall output level is the same as the master level detected at the input of the device.

The panning value is passed on to the individual channel processors for Gain Control, Frequency Modulation, and Leveling/Compression. In order to ensure consistent panning that matches the original source material, these processes are updated continuously.

Figure 2:
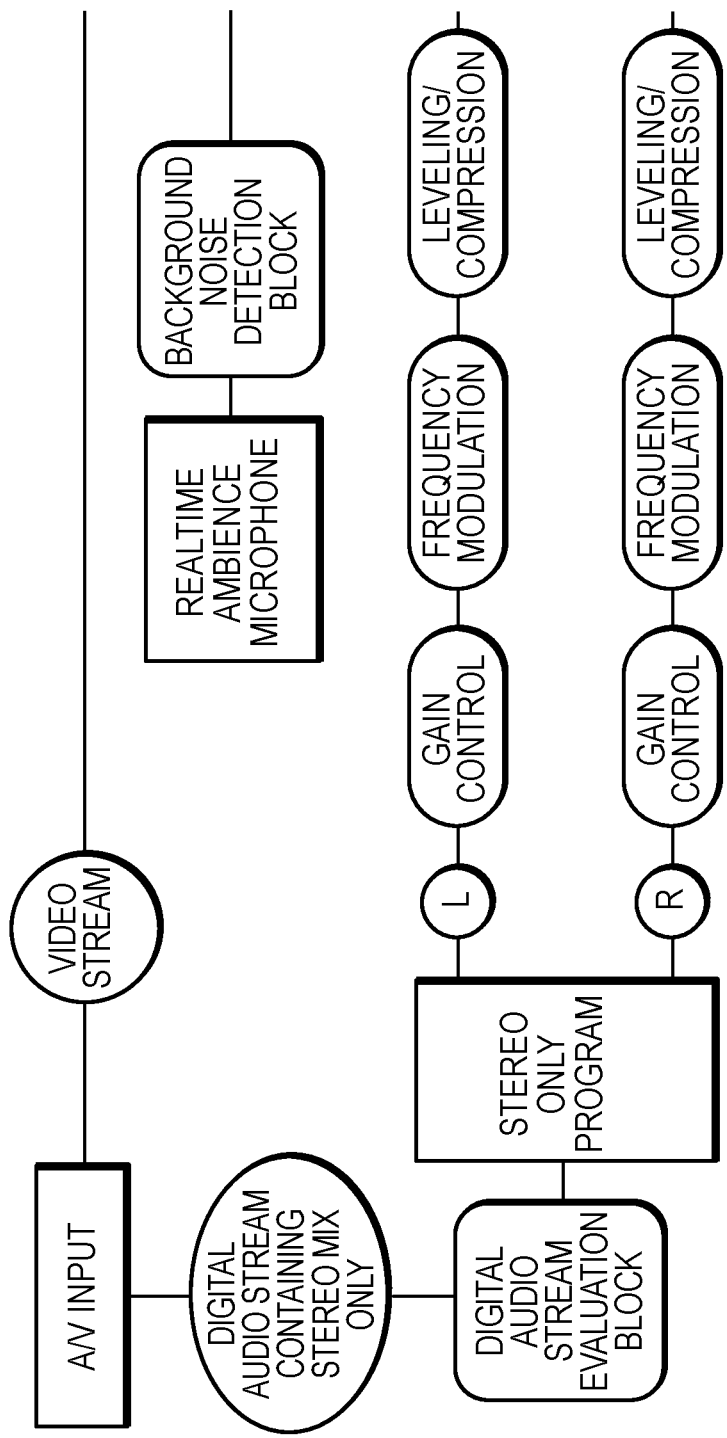
FIG. 2 illustrates a block diagram of a second example embodiment of the invention.

The Multichannel and Stereo Audio Stream Splitter 108 separates all of the channels of audio into individual channels for individual processing. In cases where there is a multichannel audio stream (5.1, 7.1, etc . . . ) present, the original stereo audio stream 114 is discarded by the Stereo Termination Block 112. In cases where there is no multichannel audio stream present, the stereo audio stream is passed on for further processing, as shown in FIG. 2.

In cases where a multichannel audio stream exists the individual channels of the multichannel audio stream are first passed on to the Gain Control processors 116-1, . . . 116-N. As shown in FIG. 1A channels 122-1, . . . 122-6 are labeled L, C, R, LS, RS, and LFE consistent with left, center, right, left surround, right surround, and low-frequency effects for a 5.1 channel audio signal. But it is understood other multichannel signals are contemplated. The individual Gain Control processors, using pre-selected settings in variable amounts (Dialog Enhancement Levels 1, 2, and 3) selected by the end user, operate to increase the overall level of the center channel while attenuating the overall levels of the right and left channels of audio. For simplicity, only the left, center, and right are discussed, but the concepts apply to other channels of 5.1, 7.1, and other signals. This is designed to have the effect of making the dialog portion of the overall signal louder and easier to understand. The values returned by the Digital Audio Stream Evaluation Block 106 which relate to the panning or spatial placement of the audio operate to dynamically adjust the gain of the left, center, and right channels of the multichannel audio stream to retain the spatial placement as intended in the original mix. The overall effect is to maintain the slightly increased level of the dialog portion of the original signal while slightly reducing the level of the coincident audio. The Gain Control processors related to the left surround and right surround channels are configured to adjust the levels of their respective channels to maintain the surround sound spatial intent of the original mix.

As the dialog level of the center channel is increased by its individual Gain Control processor, the surround channels Gain Control processors use the values derived from the 3-5 second average of the overall level to keep those channels at a consistent level relative to the center channel. The Gain Control processor 116-6 related to the LFE or subwoofer channel 122-6 use the master levels derived from the Digital Audio Stream Evaluation Block 106, the EQ Preset Block 152 and Audio Return Analysis Block 150 to adjust the level of the low frequency content of the mix. This ensures that the low frequency content does not overpower the mix, but does enhance the overall sound quality of the mix in the specific listening environment.

Figure 3A:
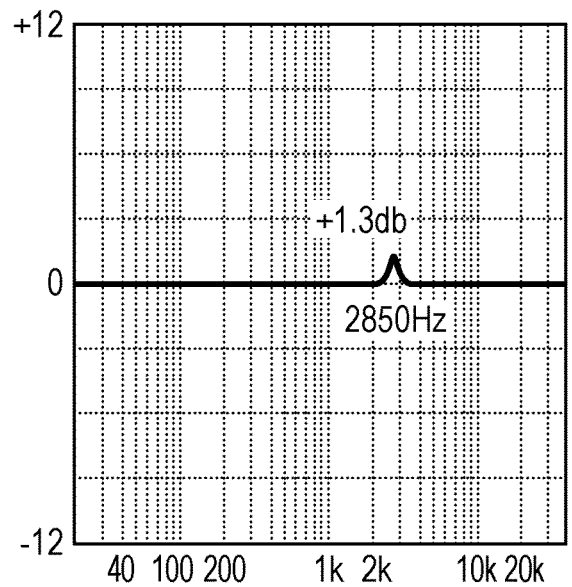
FIG. 3A-FIG. 3D illustrate example equalization plots for level 1 dialog enhancement.
Figure 3B:
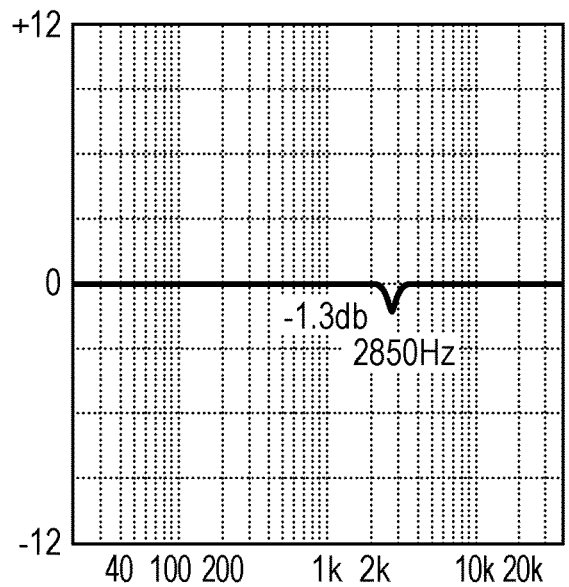
Figure 3C:
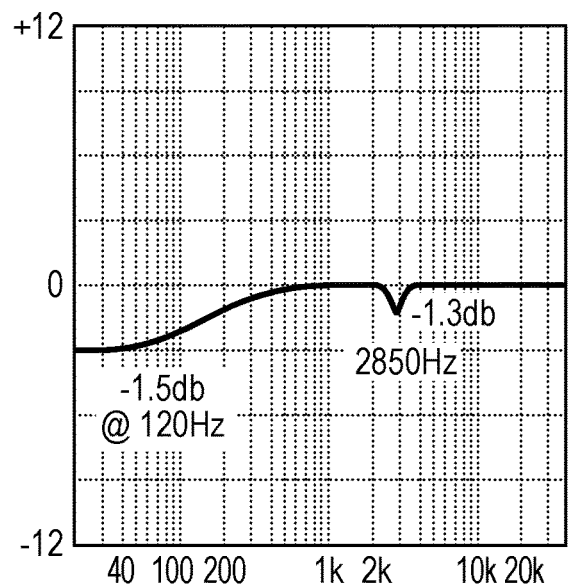
Figure 3D:
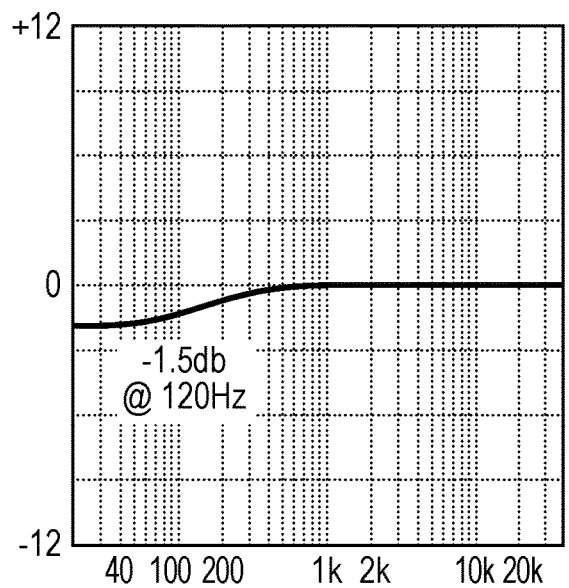
Figure 4A:
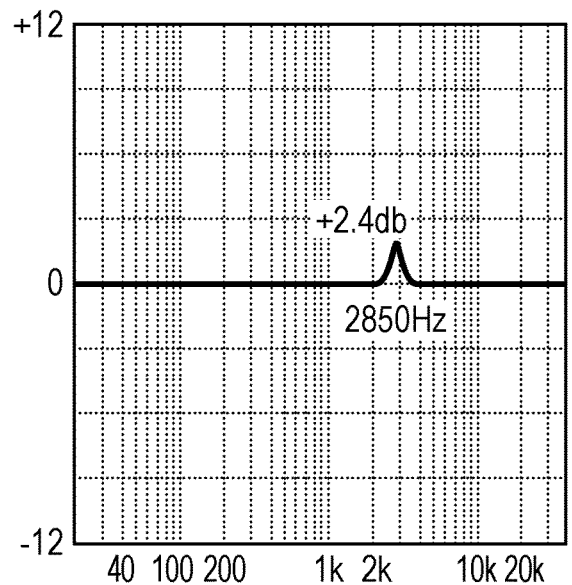
FIG. 4A-FIG. 4D illustrate example equalization plots for level 2 dialog enhancement.
Figure 4B:
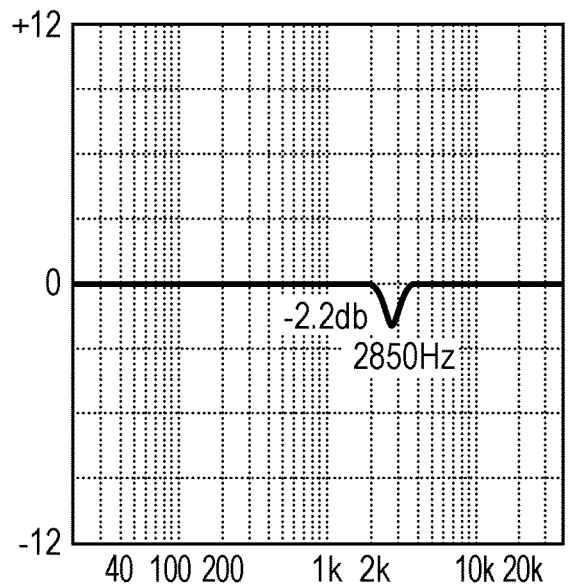
Figure 4C:
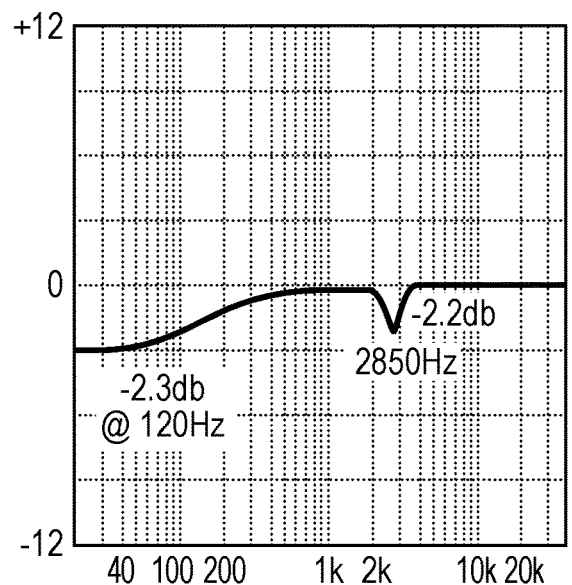
Figure 4D:
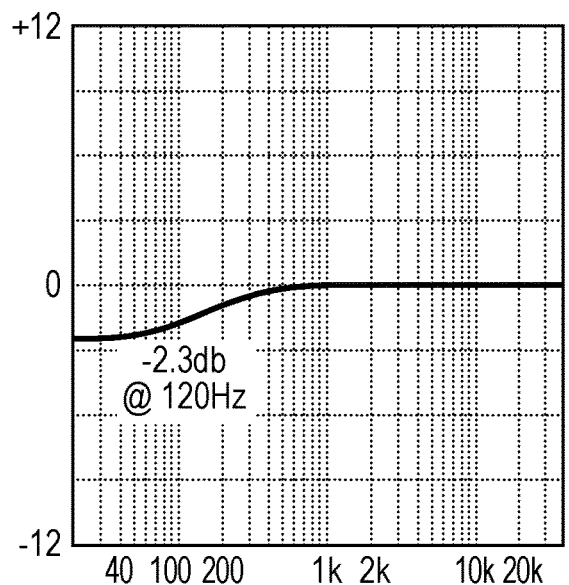
Figure 5A:
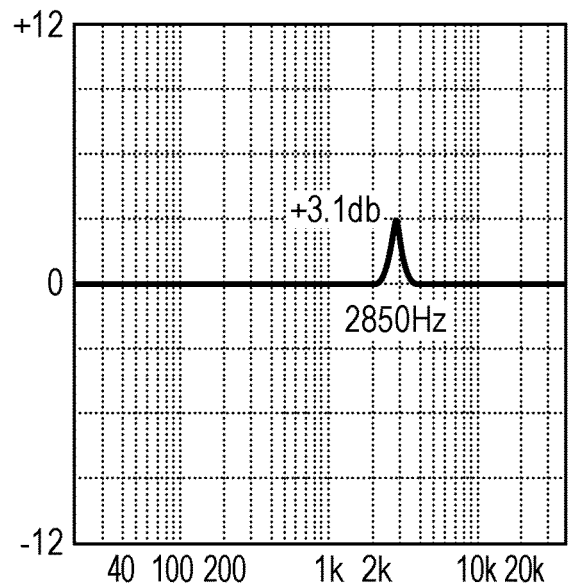
FIG. 5A-FIG. 5D illustrate example equalization plots for level 3 dialog enhancement.
Figure 5B:
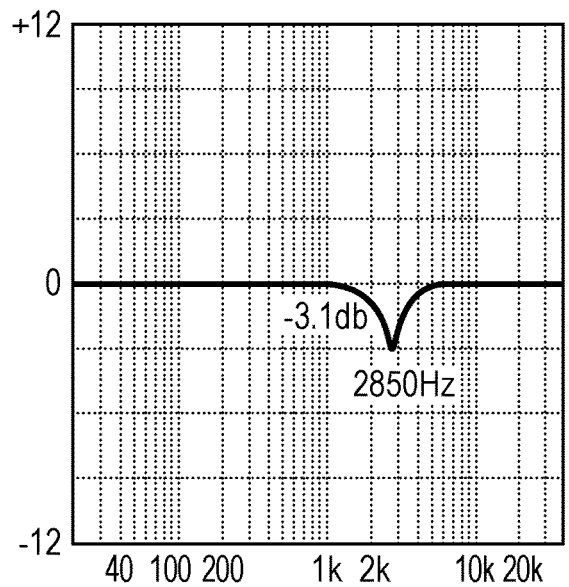
Figure 5C:
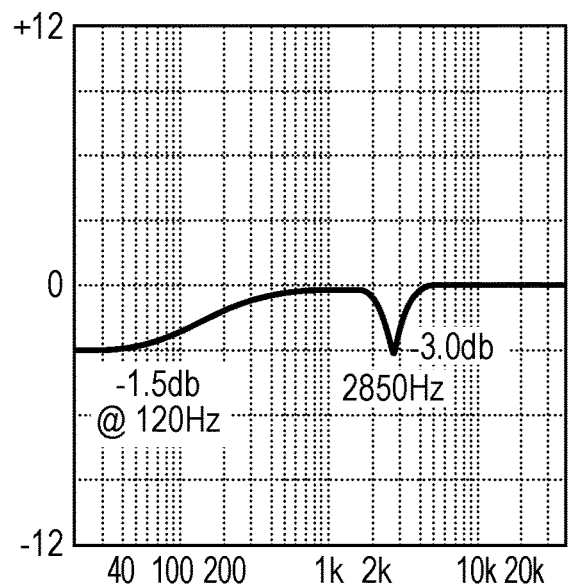
Figure 5D:
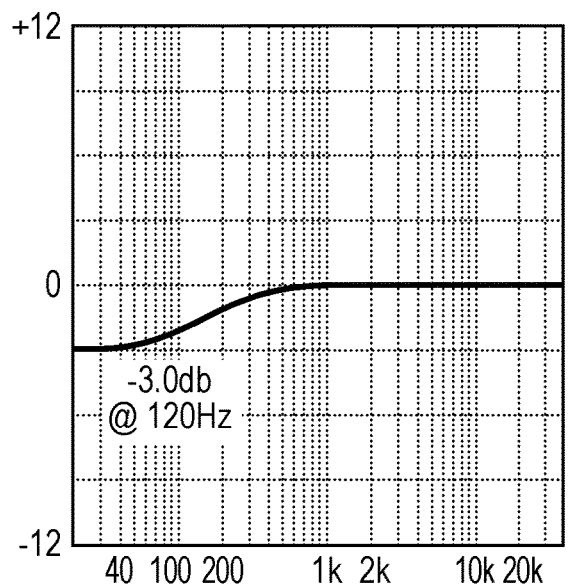

Next the individual audio channels are passed on to separate Frequency Modulation processors 118-1, . . . 118-N for each channel. The center channel 122-2 receives a slight frequency boost in the typical range of human speech and a slight reduction over the rest of the audio frequency spectrum. For example, the boost can be approximately 1 db to 3 db at 2850 Hz with a Q (bandwidth) of up to 250 cycles. This boost is also user selectable from pre-programmed presets. Example frequency plots of the boost in the center channel for the three levels of dialog enhancement, Levels 1, 2, and 3, are shown in FIGS. 3A, 4A, and 5A, respectively. The Frequency Modulation processors related to the other channels of the multichannel audio stream operate to attenuate, or scoop out, the same frequency range boosted by the center channel's Frequency Modulation processor. The cut on the other channels may be, for example, between 1 db and 3 db. Example frequency plots, which show the attenuation in the other channels for the three levels of dialog enhancement, Levels 1, 2, and 3, are illustrated in FIGS. 3B-D, 4B-D, and 5B-D, respectively. This has the effect of clearing the specified frequency range and allowing the audio associated with the center channel to stand out without increasing the overall level. Additionally, the Frequency Modulation processors for the left surround and right surround channels operate to use the data derived from the Digital Audio Stream Evaluation Block 106, the EQ Preset Block 152 and Audio Return Analysis Block 150 to adjust the equalization of those channels to best work in the listening environment and maintain the overall effect of the surround mix. Similarly, the Frequency Modulation processor 118-6 related to the LFE or subwoofer channel 122-6 also dynamically adjusts that channel's frequency range to fit the listening environment. For example, if the Audio Return Analysis Block detects a greater than normal bass response it will reduce those frequencies in this block. Further, if the Preset EQ Block carries information that a given playback system cannot process frequencies below a given value, the LFE channel's Frequency Modulation processor will cut all frequencies below that value. This has the effect of allowing the speakers of those delivery systems to work more efficiently and not distort from excess LFE material which would reduce the intelligibility of the overall mix and specifically the dialog.

After adjusting the gain and the equalization of the individual channels, the audio channels are passed to channel specific Leveling/Compression processors 120-1 . . . 120-N. These processors smooth out the audio signal on each channel individually. The Leveling/Compression processor 120-2 associated with the center channel 122-2 operates to very slightly compress the dynamic range of that channel. For example, the center channel can be compressed with a value of approximately 1.5-2.5 to 1. The desired effect is to raise the lowest level spoken audio while slightly reducing the loudest dialog to maintain a consistent audio level as it relates to the dialog. The left and right channels Leveling/Compression processors 120-1, 120-3 are set to compress those channels at an example range of 2.5-3.5 to 1 to further reduce the loudest audio incursions on those channels so they do not interfere with the audio featured on the center channel. The Leveling/Compression processors 120-1, 120-2, 120-3 for the left, center, and right channels 122-1, 122-2, 122-3 may also be dynamically controlled using the value derived in the panning evaluation process in the Digital Audio Stream Evaluation Block. This ensures that the panning and spatial relationship of the original mix is preserved. For example, if a character in the film/video moves to screen left of the picture and the original audio mix adjusts for this by panning that characters voice to the left side of the sound field, the Leveling/Compression processor 120-1 for the left channel 122-1 will, based on data from the Digital Audio Stream Evaluation Block 106, automatically adjust its compression value to the same range as the center channel until the Digital Audio Stream Evaluation Block returns a new value indicating that the panning event is over and the dialog has returned to its common position in the center channel of the multichannel mix. The Leveling/Compression processors 120-4, 120-5 related to the left surround and right surround channels also respond to the data derived from the EQ Preset Block and Audio Return Analysis Block. These channels are compressed in an example range of 1-3 to 1 dynamically based upon that data and the 3-5 second average overall level of the master level as derived in the Digital Audio Stream Evaluation Block.

After the individual processing of the independent channels of the multichannel mix, the audio channels are recombined into both a multichannel and a stereo mix. The stereo mix is created by a Multichannel to Stereo Downmixer 134. The Multichannel to Stereo Downmixer takes a typical combination of the 5.1 or 7.1 channels and creates a downmix. An example process for creating a downmix involves reducing the levels of the Center, Left, and Right channels by a specified amount to maintain the overall apparent level of the audio, reducing and frequency limiting the LFE channel and adding the LS and RS channels to the Left and Right channels with reduced overall gain. The Center and LFE channels are added into the Left and Right Channels preserving their position in the stereo field. The data from the Digital Audio Stream Evaluation Block is used to compare and set the overall master level of the stereo mix. The audio streams, both the multichannel and the downmixed stereo audio signals are then passed on to their respective Reverb/Spatial Placement Blocks 140, 144.

The purpose of the Reverb/Spatial Placement Blocks 140, 144 are to help combine the overall mix. This processor adds fractional, equal amounts of reverb to all channels simultaneously to incorporate the mix. This process is adjusted dynamically in values ranging from, for example, 0 to 5 percent. The specific value is determined by the data from the Audio Return Analysis Block 150 and the Preset EQ Block 152. In some cases no reverb will be required at all to incorporate the mix elements. In cases of extended high frequency content returning to the Audio Return Analysis Block or mapped in the Preset EQ Block, small amounts of reverb may be applied to have the effect of softening that high frequency content without sacrificing the brightness or airy quality of the overall mix.

The Realtime Ambience Microphone 126 operates to continuously take a sample of the overall sound in the listening environment. This sample is analyzed after the individual channel process blocks.

The data from the Realtime Ambience Microphone is automatically passed on to the Background Noise Detection Block 128 and Background Noise EQ Block 130. If the ambient noise increases, the overall gain of the processed mix can be set by the user to increase to compensate automatically. For example, if an air conditioner or dishwasher is activated, increasing the overall noise floor in the listening environment, the overall output level will be increased to compensate for the extra ambient noise. The overall compensation levels is user selectable using approximately the following values, 0 to 1, 0.25 to 1, 0.5 to 1 and 1 to 1. So, for example, an increase of ambient noise of 4 db would result in an increase in the overall level of 0 to 4 db based on user preference.

The next step in the process is combining the mixes back into a single stream that comprises both the multichannel and stereo audio elements, which is performed by the Multichannel and Stereo Audio Stream Combiner 154. These mixes are then passed on to the Master Equalization Block 156, which derives its equalization maps from the Audio Return Analysis Block and/or the Preset EQ Block.

The Audio Return Analysis Microphone 148 listens to a known audio source. This source can be anything from audio test signals to a program previously analyzed such as the first 10 minutes of "Star Wars" played in an ideal listening environment.

As the source is played, the Audio Return Analysis Block 150 compares the audio returning from the current listening environment to the frequency map of the same signal played in the ideal listening environment and develops specific equalization settings to bring the user's environment as close as possible to the ideal listening environment using the Master Equalization Block 156. During the initial stages of this analysis the upstream processors are disabled, after the first part of the analysis the upstream processors are enabled and adjusted based on the data returned from the analysis to establish baseline settings for all of the upstream processes. This ensures that the starting point for improving the overall quality of the audio and increasing intelligibility of the dialog is consistent with the intent of the original mix.

The EQ Preset Block 152 may be preloaded with known playback systems EQ maps. These EQ maps can be applied to the specific payback system by the Master Equalization Block 156 to further adjust the overall mix to match the playback system. For example, if an end user owns a specific model of flat panel TV for which there is a specific EQ map, that map can be applied to that user's device to adjust its equalization to match the limitations of the playback system. The EQ Preset Block 152 can be used either in conjunction with or separately from the Audio Return Analysis Block 150.

The last process in the system automatically assesses the delay associated with all of the upstream processes, which should be minimal and measured in milliseconds. The data returned from this process is used in the Video Delay Compensation Block 124 to ensure that the video 103 and audio signals maintain perfect synchronization as they are passed back out to the playback device through A/V output 158.

Stereo Only Processing. FIG. 2 illustrates the audio processing in the event that a multichannel (5.1, 7.1, etc . . . ) audio is not available for a given program. The left and right channels of the stereo mix are processed as if they were the center channel of a multichannel mix using unique values derived specifically for stereo content for the Gain Control processors 216-1, 216-2, the Frequency Modulation processors 218-1, 218-2 and the Leveling/Compression processors 220-1, 220-2.

Audio signals are received at the A/V Input 202 in the form of a stereo audio signal 204. The Digital Audio Stream Evaluation Block 206 analyzes the stereo audio signal and stores values for overall level, dynamic range, and signal placement, which is usually referred to as panning. The Digital Audio Stream Evaluation Block 206 operates in real time and is configured to continuously update the values and provide a stereo only program 210 featuring left channel 222-1 and right channel 222-2. The overall gain level and dynamic range values are calculated based on a 3-5 second average, and panning and placement values are updated instantaneously. The overall gain level value is passed on to the Stereo Mix Gain block 242 to ensure that the overall output level is the same as the master level detected at the input of the device.

The panning and spatial relationships of the stereo mix are preserved by the same method as in multichannel mix. The Gain Control processors 216-1, 216-2, the Frequency Modulation processors 218-1, 218-2, and the Leveling/Compression processors 220-1, 220-2 are dynamically adjusted based on the data returned by the Digital Audio Stream Evaluation Block 206 to ensure correct panning and spatial placement.

In addition, the stereo or mono audio is processed using the data derived from the Audio Return Analysis Block 250 and the EQ Preset Block 252 to adjust the playback system.

The Realtime Ambience Microphone 226 operates to continuously take a sample of the overall sound in the listening environment. This sample is analyzed after the individual channel process blocks. The data from the Realtime Ambience Microphone is automatically passed on to the Background Noise Detection Block 228 and Background Noise EQ Block 230.

The Audio Return Analysis Microphone 248 listens to a known audio source. The stereo mix is processed using the Audio Return Analysis Block 250, the Reverb/Spatial Placement Block 240, the Preset EQ Block 252, the Background Noise Detection Block 228 and the Master Equalization Block 256 to provide an accurate baseline for the mix adjustments made by the upstream processors.

The last process in the system automatically assesses the delay associated with all of the upstream processes, which should be minimal and measured in milliseconds. The data returned from this process is used in the Video Delay Compensation Block 224 to ensure that the video 203 and audio signals maintain perfect synchronization as they are passed back out to the playback device through A/V output 258.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
receiving a multichannel audio signal including a center channel;
processing each channel of the multichannel audio signal to enhance intelligibility of dialog in the multichannel audio signal upon playback of the multichannel audio signal, including:
processing the center channel of the multichannel audio signal further includes raising the dialog's lowest level and lowering the dialog's loudest level by compressing the center channel's dynamic range by a first ratio;
in parallel with said processing of the center channel, processing a second channel of the multichannel audio signal by compressing the second channel's dynamic range by a second ratio;
dynamically adjusting at least one of the first ratio and the second ratio based on evaluating the multichannel audio signal; and
passing the processed audio channels to a device;
wherein evaluating the multichannel audio signal includes performing a panning evaluation process on the multichannel audio signal, the method further comprising adjusting the second channel's dynamic range based on the performed panning evaluation process.

2. The method of claim 1, wherein the first ratio is any ratio between and including 1.5 to 1 and 2.5 to 1.

3. The method of claim 2, wherein the second ratio is any ratio between and including 2.5 to 1 and 3.5 to 1 that is not equal to the first ratio.

4. The method of claim 1, wherein processing the center channel of the multichannel audio signal further includes adjusting gain of the center channel by raising the gain of the center channel.

5. The method of claim 1, wherein processing the second channel of the multichannel audio signal further includes adjusting gain of the second channel by lowering the gain of the second channel.

6. The method of claim 1, wherein processing the center channel of the multichannel audio signal further includes adjusting equalization of the center channel by raising the center channel's signal level in an audio frequency range of human speech in comparison to the center channel's signal level outside the audio frequency range of human speech.

7. The method of claim 1, wherein processing the second channel further includes clearing the audio frequency range of human speech in the second channel of the multichannel audio signal by attenuating the second channel's signal level in the audio frequency range of human speech in comparison to the second channel's signal level outside the audio frequency range of human speech.

8. The method of claim 1, wherein evaluating the multichannel audio signal includes determining an overall audio level and using the overall audio level to ensure unity gain with the processed audio channels.

9. The method of claim 1, further comprising selecting one of a plurality of pre-defined different adjustment configurations for processing the multichannel audio signal.

10. A system comprising:
an input for receiving a multichannel audio signal including a center channel;
a plurality of processing modules, each processing module individually processing a channel of the multichannel audio signal to enhance intelligibility of dialog in the multichannel audio signal upon playback of the multichannel audio signal;
a first processing module configured to process the center channel of the multichannel audio signal by raising the dialog's lowest level and lowering the dialog's loudest level by compressing the center channel's dynamic range by a first ratio;
a second processing module, in parallel with the first processing module, configured to compress the second channel's dynamic range by a second ratio;
a digital audio stream evaluation module configured to perform an evaluation process on the multichannel audio signal and cause at least one of the first ratio and the second ratio to be dynamically adjusted based on the performed evaluation process; and
an output for passing the processed audio channels to a device;
wherein the evaluation process includes a panning evaluation process on the multichannel audio signal and the digital audio stream evaluation module is further configured to cause the second processing module to adjust the second channel's dynamic range based on the performed panning evaluation process.

11. The system of claim 10, wherein the first ratio is any ratio between and including 1.5 to 1 and 2.5 to 1.

12. The system of claim 11, wherein the second ratio is any ratio between and including 2.5 to 1 and 3.5 to 1 that is not equal to the first ratio.

13. The system of claim 10, wherein the first processing module is further configured to process the center channel of the multichannel audio signal by adjusting gain in the center channel by raising the gain in the center channel.

14. The system of claim 10, wherein the second processing module is further configured to process the second channel of the multichannel audio signal by adjusting gain of the second channel by lowering the gain of the second channel.

15. The system of claim 10, wherein the first processing module is further configured to adjust equalization of the center channel by raising the center channel's signal level in an audio frequency range of human speech in comparison to the center channel's signal level outside the audio frequency range of human speech.

16. The system of claim 10, wherein the second processing module, in parallel with the first processing module, is further configured to clear the audio frequency range of human speech in the second channel of the multichannel audio signal by attenuating the second channel's signal level in the audio frequency range of human speech in comparison to the second channel's signal level outside the audio frequency range of human speech.

17. The system of claim 10, wherein the evaluation process includes determining an overall audio level and using the overall audio level to ensure unity gain with the processed audio channels.

* * * * *